(12) United States Patent
Merry et al.

(10) Patent No.: US 10,760,483 B2
(45) Date of Patent: *Sep. 1, 2020

(54) TIP TURBINE ENGINE COMPOSITE TAILCONE

(71) Applicant: UNITED TECHNOLOGIES CORPORATION, Farmington, CT (US)

(72) Inventors: Brian Merry, Andover, CT (US); Gabriel L. Suciu, Glastonbury, CT (US); James W. Norris, Monmouth, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 276 days.

This patent is subject to a terminal disclaimer.

(21) Appl. No.: 15/784,629

(22) Filed: Oct. 16, 2017

(65) Prior Publication Data

US 2018/0106194 A1    Apr. 19, 2018

Related U.S. Application Data

(63) Continuation of application No. 11/720,463, filed as application No. PCT/US2004/040176 on Dec. 1, 2004, now Pat. No. 9,845,727.

(51) Int. Cl.
*F02C 1/00* (2006.01)
*F02C 3/073* (2006.01)
(Continued)

(52) U.S. Cl.
CPC .............. *F02C 3/073* (2013.01); *F02K 1/04* (2013.01); *F02K 3/068* (2013.01);
(Continued)

(58) Field of Classification Search
CPC ... B64D 33/04; F02K 1/04; F02K 1/78; F02K 3/068; F02C 3/073; F05D 2300/603; F05D 2300/614
See application file for complete search history.

(56) References Cited

U.S. PATENT DOCUMENTS

| 1,544,318 A | 6/1925 | Hodgkinson |
| 2,221,685 A | 11/1940 | Smith |

(Continued)

FOREIGN PATENT DOCUMENTS

| DE | 1301364 | 8/1969 |
| FR | 2274788 | 1/1976 |

(Continued)

*Primary Examiner* — Gerald L Sung
(74) *Attorney, Agent, or Firm* — Carlson, Gaskey & Olds, P.C.

(57) ABSTRACT

A non-metallic tailcone in a tip turbine engine includes a tapered wall structure disposed about a central axis. The non-metallic tailcone is fastened to a structural frame in the aft portion of the tip turbine engine. The tip turbine engine produces a first temperature gas stream from a first output source and a second temperature gas stream from a second output source. The second temperature gas stream is a lower temperature than the first temperature gas stream. The second temperature gas stream is discharged at an inner diameter of the tip turbine engine over an outer surface of the tailcone. Discharging the cooler second temperature gas stream at the inner diameter allows a non-metallic to be used to form the tailcone.

16 Claims, 3 Drawing Sheets

(51) Int. Cl.
*F02K 1/04* (2006.01)
*F02K 3/068* (2006.01)

(52) U.S. Cl.
CPC .. *F05D 2300/603* (2013.01); *F05D 2300/614* (2013.01); *Y02T 50/672* (2013.01); *Y10T 29/49346* (2015.01)

(56) References Cited

U.S. PATENT DOCUMENTS

| | | | |
|---|---|---|---|
| 2,414,410 A | 1/1947 | Griffith | |
| 2,499,831 A | 3/1950 | Palmatier | |
| 2,504,421 A | 4/1950 | Johnson et al. | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |
| 2,874,926 A | 2/1959 | Gaubatz | |
| 2,989,848 A | 6/1961 | Paiement | |
| 3,009,630 A | 11/1961 | Busquet | |
| 3,037,742 A | 6/1962 | Dent et al. | |
| 3,042,349 A | 7/1962 | Pirtle et al. | |
| 3,081,597 A | 3/1963 | Kosin et al. | |
| 3,132,842 A | 5/1964 | Tharp | |
| 3,204,401 A | 9/1965 | Serriades | |
| 3,216,455 A | 11/1965 | Cornell et al. | |
| 3,267,667 A | 8/1966 | Erwin | |
| 3,269,120 A | 8/1966 | Sabatiuk | |
| 3,279,192 A * | 10/1966 | Hull, Jr. | F02K 1/085 60/264 |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Hatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,054,635 A | 10/1991 | Kolom | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,331,816 A | 7/1994 | Able et al. | |
| 5,443,590 A | 8/1995 | Ciokajlo et al. | |
| 5,466,198 A | 11/1995 | McKibbin et al. | |
| 5,495,979 A | 3/1996 | Sastri et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,729,576 B2 | 5/2004 | Kay et al. | |
| 6,851,264 B2 | 2/2005 | Kirtley et al. | |
| 6,883,303 B1 | 4/2005 | Seda | |
| 6,910,854 B2 | 6/2005 | Joslin | |
| 6,966,174 B2 | 11/2005 | Paul | |
| 7,021,042 B2 | 4/2006 | Law | |
| 7,093,666 B2 | 8/2006 | Trumper | |
| 7,214,157 B2 | 5/2007 | Flamang et al. | |
| 7,526,921 B2 | 5/2009 | Williams et al. | |
| 7,966,828 B2 | 6/2011 | Cini et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |
| 2006/0207826 A1 | 9/2006 | Williams | |

FOREIGN PATENT DOCUMENTS

| | | |
|---|---|---|
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059988 | 6/2006 |
| WO | 2006059989 | 6/2006 |

(56) References Cited

FOREIGN PATENT DOCUMENTS

| | | |
|---|---|---|
| WO | 2006060006 | 6/2006 |
| WO | 2006062497 | 6/2006 |
| WO | 2006059971 | 8/2006 |
| WO | 2006059979 | 6/2007 |

\* cited by examiner

TIP TURBINE ENGINE COMPOSITE TAILCONE

This application is a continuation of U.S. patent application Ser. No. 11/720,463 filed May 30, 2007 which was a National Application of PCT/US2004/040176 filed Jan. 12, 2004.

This invention was made with government support under Contract No. F33657-03-C-2044. The government therefore has certain rights in this invention.

BACKGROUND OF THE INVENTION

The present invention relates to a tip turbine engine, and more particularly to a non-metallic composite tailcone for the tip turbine engine.

An aircraft gas turbine engine of the conventional turbofan type generally includes a forward bypass fan and a low pressure compressor, a middle core engine, and an aft low pressure turbine all located along a common longitudinal axis. Air flows into the engine at an inner diameter and an outer diameter of the engine. Air entering through the outer diameter of the engine exits the rear of the engine at the outer diameter as a relatively low temperature gas stream after flowing through the bypass fan.

Airflow entering the inner diameter of the engine enters a high pressure compressor driven by a high pressure turbine to compress the air to a high pressure. This high pressure air is then mixed with fuel in a combustor and ignited to form a relatively high temperature gas stream. The high temperature gas stream flows axially aft to rotatably drive the high pressure turbine which rotatably drives the high pressure compressor through the high pressure shaft. The high temperature gas stream leaving the high pressure turbine is expanded through the low pressure turbine which rotatably drives the bypass fan and low pressure compressor through a low pressure shaft. The high temperature gas stream exits the rear of the engine at the inner diameter from the low pressure turbine and flows over a tailcone. The tailcone is made of titanium or other metal to withstand the elevated temperatures of the high temperature gas stream.

Although highly efficient, conventional turbofan engines operate in an axial flow relationship where airflow essentially travels linearly through the engine. The axial flow relationship results in a relatively complicated elongated engine structure of considerable length relative to the engine diameter. This elongated shape may complicate or prevent packaging of the engine in particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor that is radially outward from the fan blades and near an outside diameter of the tip turbine engine. The airflow and fuel mixture is ignited to form a relatively high temperature gas stream which drives the turbine integrated onto the tips of the hollow bypass fan blades for rotation therewith as disclosed in U.S. Patent Application Publication Nos. 2003192303; 20030192304; and 20040025490. Unlike conventional engines, the relatively high temperature gas stream exits the rear of the tip turbine engine at the outside diameter, while the relatively low temperature gas stream flowing through the bypass fan exits the rear of the tip turbine engine at the inner diameter and flows over the tailcone.

Accordingly and because of the low temperature gas stream discharged from the inner diameter in a tip turbine engine, it is desirable to provide a lighter, non-metallic tailcone in the tip turbine engine.

SUMMARY OF THE INVENTION

The non-metallic tailcone according to the present invention includes a wall structure disposed about a central axis. The wall structure defines an interior compartment and a forward portion that tapers to an aft portion of the non-metallic tailcone. The wall structure of the non-metallic tailcone is a polymer composite that includes woven Kevlar™ fiber impregnated with bismaleimide.

The tip turbine engine produces a first temperature gas stream from a first output source and a second temperature gas stream from a second output source. The first output source is a combustor and the second output source is a bypass fan. The second temperature gas stream from the bypass fan is a lower temperature than the first temperature gas stream from the combustor. The first temperature gas stream is discharged from the combustor at an outer diameter of the tip turbine engine. The second temperature gas stream is discharged from the bypass fan at an inner diameter of the tip turbine engine and flows over the tailcone mounted to a structural frame of the engine. Discharging the warmer first temperature gas stream at the outer diameter and the cooler second temperature gas stream at the inner diameter allows a non-metallic to be used to form the tailcone.

The present invention therefore takes advantage of the cooler temperature gas stream discharged from the inner diameter in a tip turbine engine by providing a light weight non-metallic tailcone in the tip turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
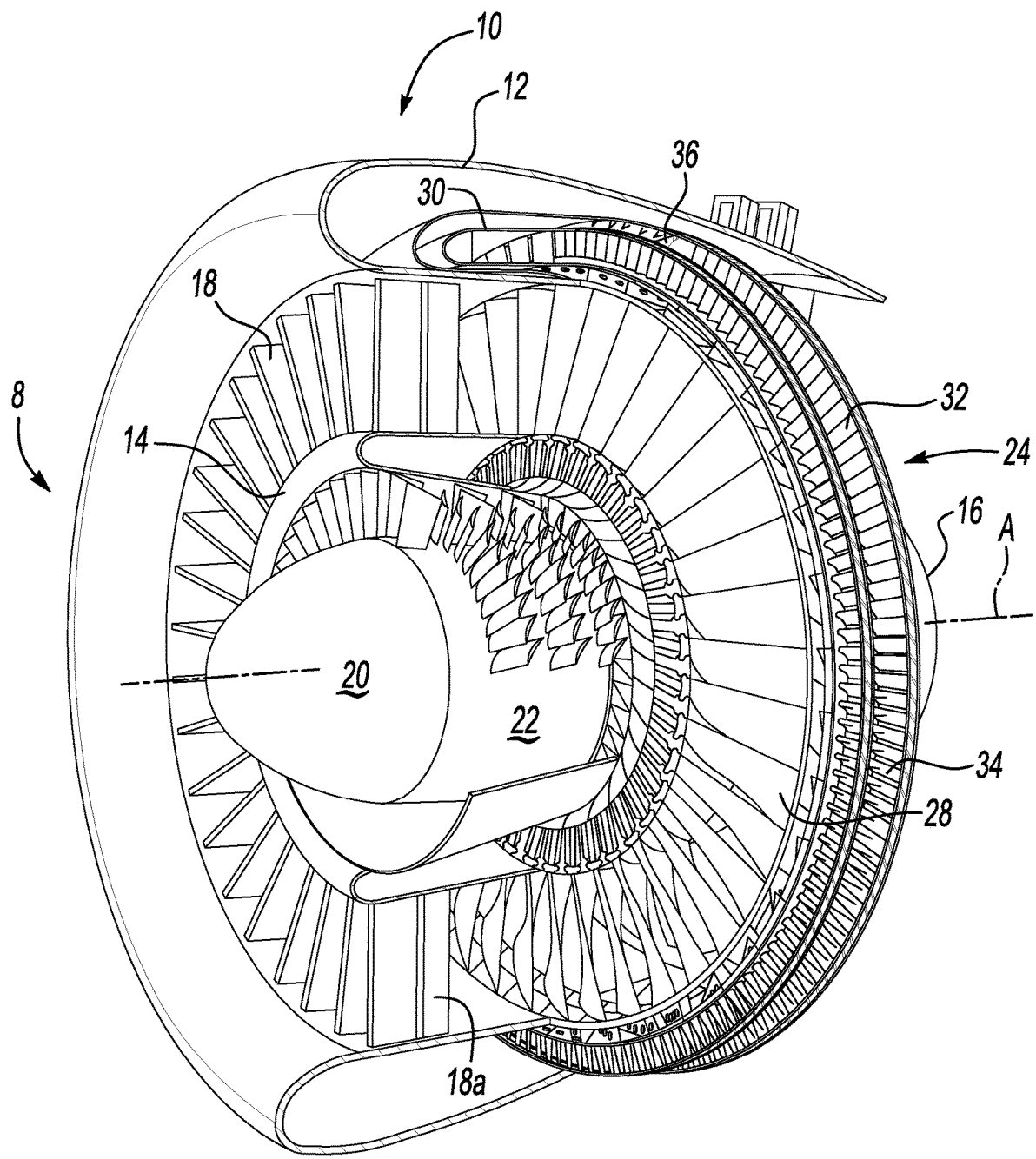
FIG. 1 is a partial sectional perspective view of an exemplary tip turbine engine incorporating a non-metallic tailcone according to the present invention.

FIG. 1 illustrates a partial sectional perspective view of a tip turbine engine (TTE) type gas turbine engine 8. The engine 8 includes an outer case 10, a nonrotatable static outer support structure 12, a nonrotatable static inner support structure 14, and a non-metallic tailcone 16. A plurality of fan inlet guide vanes 18 are mounted between the static outer support structure 12 and the static inner support structure 14. Each inlet guide vane preferably includes a variable trailing edge 18A.

A nosecone 20 is preferably located along the engine centerline A to improve airflow into an axial compressor 22.

The axial compressor 22 is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the nonrotatable static outer support structure 12.

A turbine 32 includes a plurality of tip turbine blades 34 (two stages shown) which rotatably drive the hollow fan blades 28 relative to a plurality of tip turbine stators 36 which extend radially inwardly from the nonrotatable static outer support structure 12. The annular combustor 30 is axially forward of the turbine 32 and communicates with the turbine 32.

Figure 2:
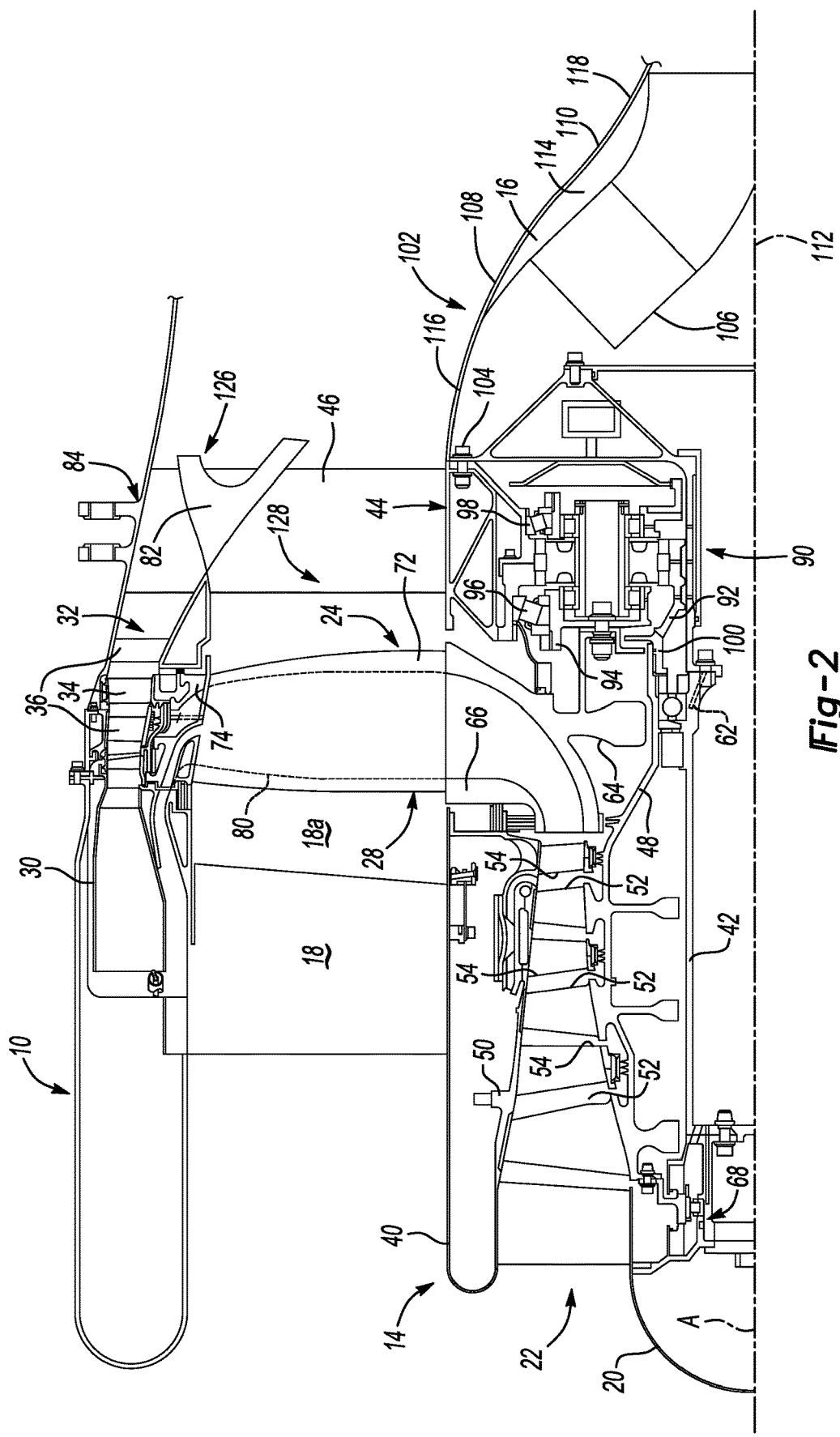
FIG. 2 is a cross-sectional view of the tip turbine engine of FIG. 1.

Referring to FIG. 2, the nonrotatable static inner support structure 14 includes a splitter 40, a static inner support housing 42 and a static outer support housing 44 located coaxial to said engine centerline A. The static outer support housing 44 includes exit guide vanes 46 that extend radially outward to the outer case 10.

The axial compressor 22 includes the axial compressor rotor 48 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 48 in stages (three stages of compressor blades 52 and compressor vanes 54 are shown in this example). The axial compressor rotor 48 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each hollow fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed.

From the core airflow passage 80, the airflow is turned and diffused toward an axial airflow direction toward the annular combustor 30. Preferably the airflow is diffused axially forward in the engine 8, however, the airflow may alternatively be communicated in another direction. An exhaust mixer 82 extends from an exhaust case portion 84 of the outer case 10 and guides airflow exiting the annular combustor 30 over the tip turbine blades 34 and tip turbine stators 36.

A gearbox assembly 90 aft of the fan-turbine rotor assembly 24 provides a speed increase between the fan-turbine rotor assembly 24 and the axial compressor 22. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 48. The gearbox assembly 90 is mounted for rotation between the sun gear shaft 92 and the static outer support housing 44 through a forward bearings 96 and a rear bearing 98. The forward bearings 96 and the rear bearing 98 are both tapered roller bearings and both handle radial loads. The forward bearing 96 handles the aft axial load, while the rear bearing 98 handles the forward axial loads.

The sun gear shaft 92 is rotationally engaged with the axial compressor rotor 48 at a splined interconnection 100 or the like. Alternatively, the gearbox assembly 90 could provide a speed decrease between the fan-turbine rotor assembly 24 and the axial compressor rotor 48.

The non-metallic tailcone 16 is part of a tailcone assembly 102 that attaches to the static outer support housing 44 with a set of fasteners 104, although only one fastener is illustrated in the FIG. 2. The tailcone assembly 102 houses a device 106, such as an oil cooler or other device, and includes a frustoconical surface 108. A wall structure 110 disposed about central axis 112 forms the frustoconical surface 108. The wall structure 110 defines an interior compartment 114 and a forward portion 116 that tapers to an aft portion 118 of the tailcone assembly 102.

A polymer forms the wall structure 110. Preferably the polymer is a polymer composite and includes woven Kevlar™ fiber impregnated with bismaleimide. Other polymer composites such those utilizing epoxy, other polymers, carbon fibers, glass fibers, and other reinforcing substances may also be utilized. Use of a non-metal may provide the benefit of a lighter overall engine weight compared to conventional titanium or other metal tailcones, as the density of non-metals is generally lower than the density of metal. Alternatively, a ceramic matrix composite may be utilized, including ceramic matrix composites with metallic reinforcing substances.

In operation, air enters the engine 8 at the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28.

From the core airflow passage 80, the airflow is turned and diffused axially forward in the engine 8 into a first output, an annular combustor 30. The compressed core airflow from the hollow fan blades 28 is mixed with fuel in the annular combustor 30 and ignited to form a first temperature gas stream. The first temperature gas stream is expanded over the plurality of tip turbine blades 34 mounted about the outer periphery of the fan-turbine rotor assembly 24 to drive the fan-turbine rotor assembly 24, which in turn drives the axial compressor 22 through the gearbox assembly 90. The first temperature gas stream then exits the tip turbine blades 34 and is guided by the exhaust mixer 82.

Concurrent therewith, a second output, the fan-turbine rotor assembly 24, discharges a second temperature gas stream at an inner engine diameter 128 to merge with the first temperature gas stream from the turbine 32. The combined airflow exits the engine 8 over the frustoconical surface 108 of the non-metallic tailcone 16 to provide forward thrust. The cooler second temperature gas stream from the hollow fan blades 28 discharging at the inner engine diameter 128 over the tailcone assembly 102 allows the non-metallic tailcone 16 to be formed from polymer rather than more temperature resistant titanium or metal material as in conventional engines.

Figure 3:
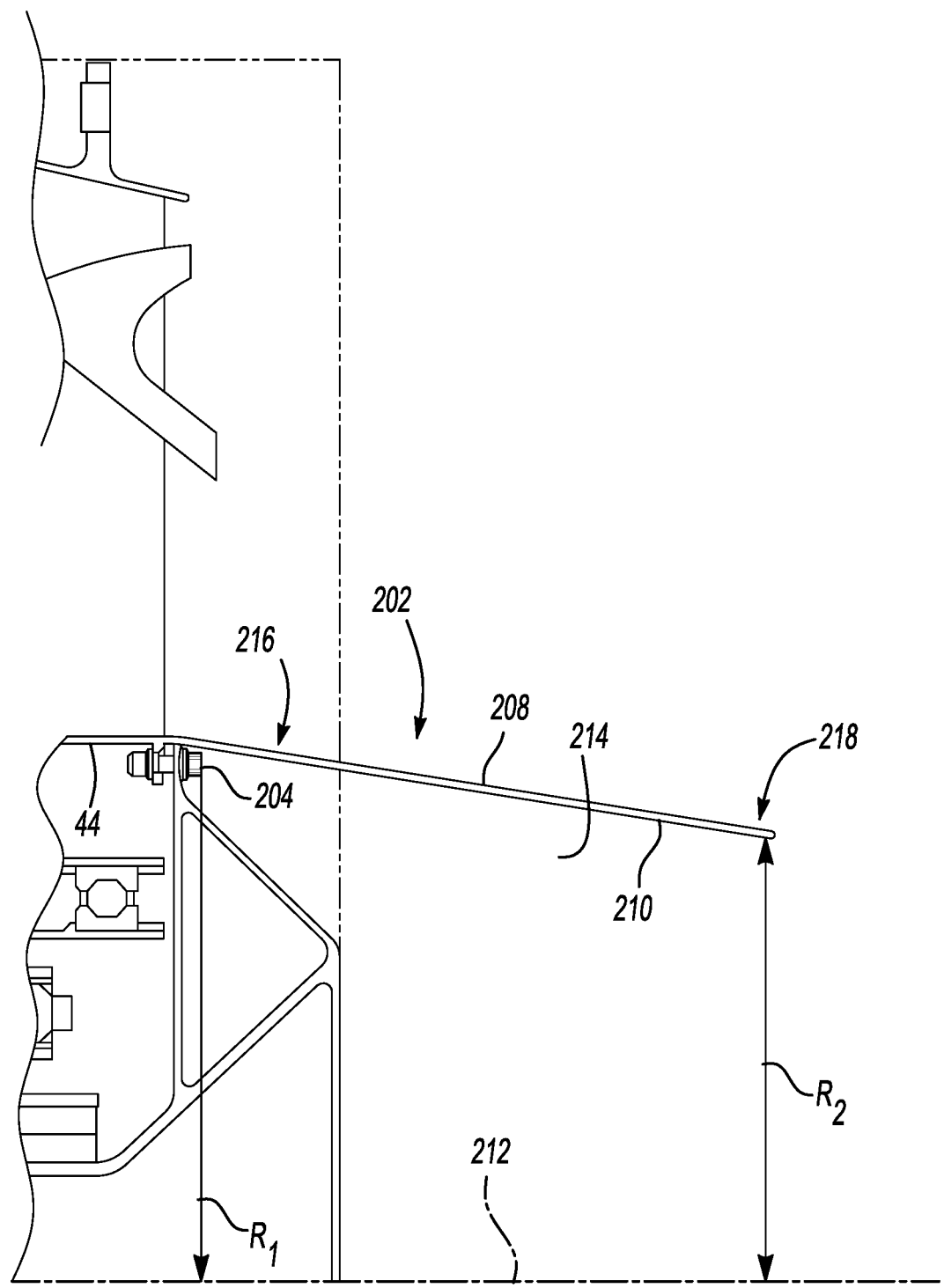
FIG. 3 is a cross-sectional view of a second embodiment of a non-metallic tailcone according to the present invention.

FIG. 3 shows a partial cross-sectional view of a second embodiment of a non-metallic tailcone according to the present invention. The non-metallic tailcone 202 is attached to the static outer support housing 44 with a set of fasteners 204, although only one fastener is illustrated in the FIG. 3. The non-metallic tailc one 202 includes a frustoconical surface 208 and a wall structure 210 disposed about a central axis 212. The wall structure 210 defines an interior compartment 214 and a forward portion 216 with a first radius $R_1$ that tapers to an aft portion 218 with a radius R2 which is less than the diameter $R_1$. Preferably, the non-metallic tailcone 202 includes woven Kevlar™ fiber impregnated with bismaleimide. Other composites such as those utilizing epoxy, other polymers, carbon fibers, glass fibers, other reinforcing substances, and ceramic matrix composites may also be utilized. Use of a non-metallic composite may provide the benefit of a lighter overall engine weight compared to conventional titanium or other metal tailcones, as the density of non-metals is generally lower than the density of metal.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tailcone system of a tip turbine engine comprising:
a first temperature gas stream from a first output;
a second temperature gas stream from a second output, said second temperature being less than said first temperature;
a non-metallic tailcone mounted aft of said first output and said second output, said non-metallic tailcone receiving at least said second temperature gas stream over an outer surface of said non-metallic tailcone, and wherein said non-metallic tailcone comprises a non-metallic wall structure consisting of a fiber reinforced polymer composite material disposed about a central axis, said non-metallic wall structure defining a forward portion and an aft portion, said non-metallic tailcone tapering from said forward portion to said aft portion and defining an interior compartment along said central axis.

2. A tailcone system as recited in claim 1, wherein said second temperature gas stream is radially inward from said first temperature gas stream.

3. A tip turbine engine including the tailcone system as recited in claim 1, wherein said first output comprises a combustor.

4. A tip turbine engine including the tailcone system as recited in claim 3, wherein said second output comprises a bypass fan with a fan blade defining a core airflow passage therethrough.

5. The tailcone system of claim 1, wherein said fiber reinforced polymer composite material comprises woven fiber reinforcement.

6. The tailcone system of claim 1, wherein said fiber reinforced polymer composite material comprises aramid synthetic fiber reinforcement.

7. The tailcone system of claim 1, wherein said fiber reinforced polymer composite material comprises glass fiber reinforcement.

8. The tailcone system of claim 1, wherein said fiber reinforced polymer composite material comprises carbon fiber reinforcement.

9. The tailcone system of claim 1, wherein said fiber reinforced polymer material composite comprises epoxy.

10. The tailcone system of claim 1, further comprising an oil cooler device mounted at least partially within said interior compartment.

11. The tailcone system of claim 1, wherein said tip turbine engine includes a plurality of hollow fan blades each having a radially extending core air flow passage to compress air flow.

12. The tailcone system of claim 11, wherein the tailcone is arranged axially aft of the plurality of hollow fan blades to receive the first temperature gas stream having the first temperature from the plurality of hollow fan blades and the second temperature gas stream having the second temperature from the combustor.

13. The tailcone system of claim 12, wherein the first gas stream is radially inward of the second gas stream relative to the central axis.

14. The tailcone system of claim 12, wherein the non-metallic tailcone is axially aft of the combustor.

15. The tailcone system of claim 1, wherein the non-metallic wall structure is attached to a static outer support housing.

16. The tailcone system of claim 1, wherein the non-metallic wall structure forms a frustoconical surface.

* * * * *